US009186703B2

(12) United States Patent
Lane et al.

(10) Patent No.: US 9,186,703 B2
(45) Date of Patent: Nov. 17, 2015

(54) LOCKING TWIST PIN SCREEN PANEL RETAINER

(71) Applicants: Tracy Leonard Lane, Princeton, WV (US); Frank J. Bacho, Princeton, WV (US)

(72) Inventors: Tracy Leonard Lane, Princeton, WV (US); Frank J. Bacho, Princeton, WV (US)

(73) Assignee: CONN-WELD INDUSTRIES, INC., Princeton, WV (US)

( * ) Notice: Subject to any disclaimer, the term of this patent is extended or adjusted under 35 U.S.C. 154(b) by 274 days.

(21) Appl. No.: 13/628,399

(22) Filed: Sep. 27, 2012

(65) Prior Publication Data

US 2014/0086706 A1 Mar. 27, 2014

(51) Int. Cl.
*F16B 21/00* (2006.01)
*B07B 1/46* (2006.01)

(52) U.S. Cl.
CPC ........... *B07B 1/4645* (2013.01); *B07B 2201/02* (2013.01)

(58) Field of Classification Search
CPC ............. B07B 1/46; B07B 1/28; F16B 21/00; F16B 21/02; F16B 21/07; F16B 21/071; F16B 21/08; F16B 21/084; F16B 21/086
USPC .......... 411/512, 549, 511, 349, 553; 209/405, 209/392, 404; 24/453, 287, 581.11, 580.1
See application file for complete search history.

(56) References Cited

U.S. PATENT DOCUMENTS 3,123,389 A * 3/1964 Biesecker ..................... 292/218
3,220,078 A * 11/1965 Preziosi ........................ 411/349
3,272,061 A * 9/1966 Seckerson ....................... 411/15
4,657,462 A * 4/1987 Hoen ............................ 411/552
5,112,475 A 5/1992 Henry, Jr.
5,142,834 A * 9/1992 Laclave et al. .................. 52/208
5,277,319 A 1/1994 Henry, Jr.
5,398,817 A 3/1995 Connolly et al.
6,182,482 B1 * 2/2001 Issitt ............................... 70/160
6,811,033 B1 * 11/2004 Owen ........................... 209/399
6,957,741 B2 10/2005 Freissle et al.
6,964,341 B2 11/2005 Bacho et al.
7,240,801 B2 7/2007 Freissle et al.
7,604,127 B2 10/2009 Freissle et al.
7,717,269 B2 5/2010 Bacho et al.
7,959,009 B2 6/2011 Weaver et al.
8,025,153 B2 9/2011 Freissle et al.
8,025,154 B2 * 9/2011 Kriel ............................. 209/405
8,281,934 B1 10/2012 Connolly et al.
2007/0172336 A1 * 7/2007 Hsu ............................... 411/508
2009/0080999 A1 * 3/2009 Dunn ............................ 411/500
2009/0184032 A1 * 7/2009 Zubovich ...................... 209/405
2011/0180461 A1 7/2011 Lane et al.
2011/0262243 A1 * 10/2011 Glickman ..................... 411/337

* cited by examiner

*Primary Examiner* — Roberta Delisle
(74) *Attorney, Agent, or Firm* — Mattingly & Malur, PC

(57) ABSTRACT

A locking twist pin screen panel retainer system utilizes a plurality of twist pins, each with a mushroom-shaped screen panel engaging head. Each one of the locking twist pins is positionable in a deformable receiver which is attachable to a support tube or bottom rail of a vibrating separatory machine. Insertion of the individual twist pins each into a cooperating one of the retainers, and the subsequent rotation of each twist pin through 90°, both secures the pin in the cooperating receiver and also secures the receiver in place on the underlying support tube or rail of the vibrating separatory machine. Removal of the pins and their receivers, if necessary, is accomplished by a further rotation of each pin through another 90°.

9 Claims, 6 Drawing Sheets

FIG. 7
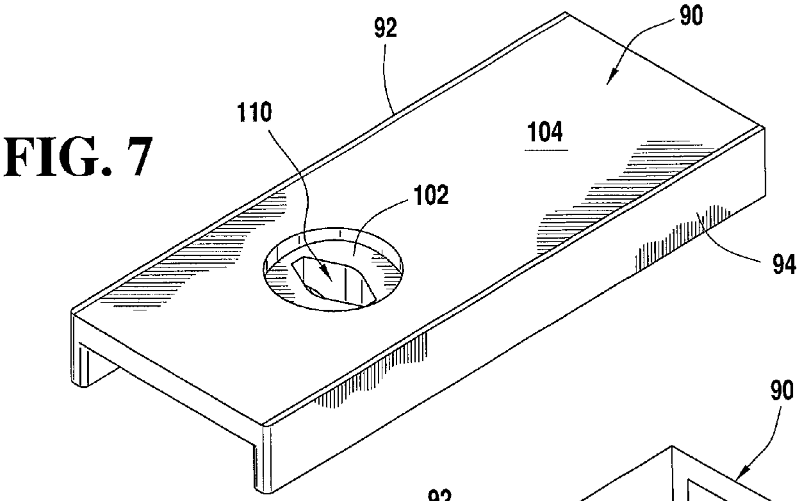
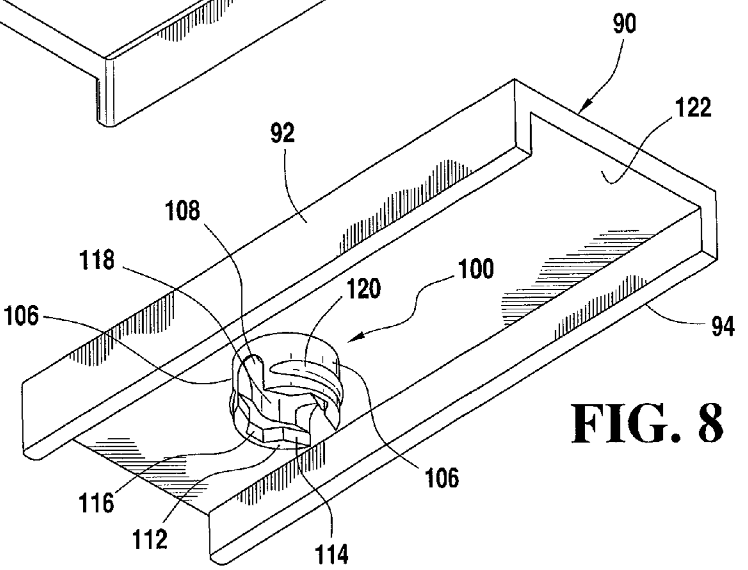
FIG. 8
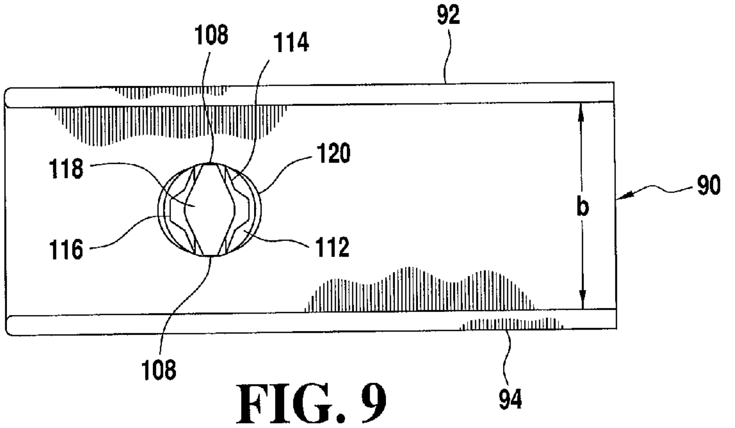
FIG. 9

LOCKING TWIST PIN SCREEN PANEL RETAINER

FIELD OF THE INVENTION

The present invention is directed generally to a locking twist pin screen panel retainer system. More particularly, the present invention is directed to a locking twist pin screen panel retainer system for use in securing and retaining screen panels on a vibrating separatory device. Most specifically, the present invention is directed to a locking twist pin screen panel retainer system that is usable to releaseably retain screen panels on underlying supports of a vibrating separatory machine. Each locking twist pin has an upper mushroom-shaped screen panel engaging head. The shank of each such pin is sized to be positioned in an aperture formed in a deformable receptacle configured as either a deck support tube cover plate that is positionable on a deck support tube or as a receiving collar that is insertable into a pipe hole assembly which, in turn, has been secured to a bottom rail of the vibrating separatory device. Once the pin shank has been inserted into a cooperatively shaped aperture of the deformable receptacle, it is then rotatable through 90° about a longitudinal pin axis, to lock the pin and the receptacle to the deck support tube or to the deck bottom rail. Each locking twist pin's mushroom-shaped head is then engagable with a cooperatively shaped chamber in a sidewall or face of a screen panel. The screen panels are thereby securely yet removably attachable to the underlying deck support tube or deck bottom rail.

BACKGROUND OF THE INVENTION

Vibrating and other separatory screen assemblies are generally known in the art and are very useful in accomplishing the separation of materials, on the basis of the size of the materials to be separated. A slurry of liquid and entrained solids can be caused to run or to flow across an upper surface of a screen panel assembly. Particles of at least a certain size will not pass through apertures in the screen panels and will thus be separated out of the slurry. The screen panel assembly is caused to vibrate by a suitable vibratory drive, with this vibratory motion being beneficial in facilitating the proper separation of the slurry which is directed onto the screen panel.

One such vibrating separatory screen panel assembly is shown in U.S. Pat. Nos. 5,112,475 and 5,277,319, both to Henry, and both assigned to Conn-Weld Industries, the assignee of the present application. In those two patents, there is disclosed a screen panel mounting system for a vibrating screen assembly. There is also disclosed a screen panel which is securable in the vibrating screen assembly by using the panel mounting system. A plurality of screen panels are secured to a panel deck of a frame portion of a vibrating screen assembly. A plurality of elongated hold downs or center retainers, which are made of a resilient elastomeric material, such as polyurethane, are provided with integral spaced anchoring pins along their bottom surface. Those integral, spaced anchoring pins are receivable in apertures in an anchor member. Once the hold down members or center retainers have been secured to the anchor member, which is, in turn, attached to spaced cross members or tubes of the frame of the vibratory separator, the screen panels are placed atop the panel deck with their side edges in contact with the center retainers. Elongated key members are inserted into upwardly facing slots in the center retainers to spread wing portions of the retainers laterally outwardly. This spreading of the wings of the center retainers causes the wings to grip the side edges of the screen panels so that these panels are secured in the vibrating screen assembly.

A center retainer assembly for a panel mounting system is disclosed in U.S. Pat. No. 5,398,817 to Connolly et al. which is also assigned to Conn-Weld Industries. The center retainer assembly described in the '817 patent utilizes an elongated bolting bar which is encased in a resilient material and which includes an elongated center retainer. The center retainer assembly of this patent is placed into an upwardly facing retainer channel and is secured to the retainer channel by placement of the bolts carried by the bolting bar through holes in the retainer channel. The retainer channel is, in turn, secured to mounting plates that are attached to a cross tube or to a cross bar of a vibrating screen assembly.

A more recent screen panel retainer system is described in U.S. Pat. No. 6,964,341 to Bacho et al. That patent is also assigned to Conn-Weld Industries, the assignee of the subject patent application. In that system, the screen panels are held in place by screen panel edge strips which have pockets on their undersurfaces. Those pockets are cooperatively shaped to receive a plurality of ears that are situated on upper surfaces of retainer bars. Those retainer bars are connected to the underlying deck stringer tubes.

A snap lock separatory panel and retainer system is disclosed in U.S. Pat. No. 7,717,269, also to Bacho et al., and also assigned to Conn-Weld Industries, Inc. In that patent there is disclosed a snap lock separatory panel retainer system as well as a separatory panel which is usable with the retainer system. Elongated locking strips are used to engage locking profiles on the separatory screen panels. Those locking strips utilize undercut receptacles to receive enlarged heads of retainer pins that are formed integrally with center retainer strips. Those center retainer strips are, in turn, secured to the deck stringer tubes that are typically provided in vibrating separatory machines. The locking strips are snap locked onto the center retainer by the engagement of the enlarged heads of the retainer pins in the cooperatively shaped undercut receptacles in the locking strips.

Another screen panel retainer system is described and depicted in U.S. patent application Ser. No. 13/049,000 which was filed on Mar. 16, 2011 in the names of inventors James D. Connolly et al, which issued as U.S. Pat. No. 8,281,934 on Oct. 9, 2012 and which is also assigned to CONN-WELD INDUSTRIES, INC. This patent describes a screen panel retainer system in which a plurality of metal retainer bars are attachable to the underlying surface of the vibrating separatory device machine frame. Each such metal retainer bar is provided with spaced, upwardly projecting, generally mushroom-shaped screen panel retainers. The retainers are rigid and are shaped to be receivable in cooperatively shaped retainer receiving chambers in either urethane screen panel edges or profile wire screen panel edges.

The various screen panel retainer systems, as described and depicted in the several Conn-Weld Industries patents and applications discussed above, have all enjoyed some degree of success in the industry. However, each has its individual limitations which have made each system less than suitable for use in all equipment, regardless of manufacturer and configuration. Several of the earlier systems required modification or reworking of the industry standard deck stringer tubes. Others, such as the system described in the Bacho et al. U.S. Pat. No. 6,964,341 have been found somewhat difficult to use and have required the provision of screen panel edge strips that have had to be field-installed on the replacement screen panels. Adjacent screen panels have sometimes required the use of cooperating and abutting screen panel edge strips. The abutment and alignment of these screen panel edge strips has been somewhat difficult to obtain in the field. This has increased the time that is required to both initially install the prior systems and to then replace worn screen panels with replacement screen panels. When a machine, which is operating in an industrial setting, must be taken out of service for repair or replacement of essential elements, that is a loss of that machine's production capacity. Such losses need to be kept at a minimum.

Several of the prior screen panel securement arrangements have required numerous parts and have been expensive to make and install. As discussed above, when a production machine is taken out of service, money is lost. It is thus imperative that the screen panel retainer system be relatively simple, having a limited number of components, that it be quick and easy in its installation, and universal in its ability to adapt to all of the various vibrating separatory machines that are used in the industry. Various machines utilize deck stringer tubes that are secured atop machine cross frame tubes which are frame components of the vibrating separatory machines. The deck stringer tubes are typically 2"×2" hollow steel tubes and are provided with mounting holes spaced along an upper surface of each such deck stringer tube at a spacing distance of 4". Other machines are provided with angle iron members that are secured to the cross members of the vibrating separatory machine. The screen panel retainer system must be adaptable for use with the diverse separatory machines that are currently in use.

A vibrating separatory machine uses an array of screen panels to separate solid materials from a slurry. The screen panels are situated in an array that typically utilizes a plurality of screens abutting each other, or adjacent to each other both in a direction of material flow and also in a direction that is traverse to the material flow direction. It is the exposed surface area of these screen panels which accomplishes the material separation. The greater the amount of exposed screen surface, the greater capacity for material separation the machine will have. In some of the prior systems, both those made by the assignee of the subject application, and by others, the retainer structures have tended to cover over substantial portions of the sides or edges of adjacent ones of the screen panels. While that reduction in available screen surface area may amount to only 5% of the total screen surface area, that is still 5% of the total screen surface area which is no longer available for accomplishing the machine's primary objective of separation of solids from a slurry. Any increase in open screen area will improve the operating characteristics of the vibrating separatory machine that uses the screen panel center retainer system of the present invention.

It will thus be understood that a need exists for a screen panel retainer system which overcomes the limitations of the prior systems, which is easily installed and operable, which is adaptable to various deck stringer tubes and machine frame machine cross frame tubes and which does not obstruct open screen area. The screen panel retainer system, in accordance with the present invention, overcomes the limitations of prior art and is a substantial advantage over the presently available systems.

SUMMARY OF THE INVENTION

It is an object of the present invention to provide a locking twist pin screen panel retainer system.

Another object of the present invention is to provide a locking twist pin screen panel retainer system that uses a minimum number of components.

A further object of the present invention is to provide a locking twist pin screen panel retainer system that is usable with a number of different vibrating separatory machines.

Still another object of the present invention is to provide a locking twist pin screen panel retainer system which does not reduce the working surface areas of the screen panels with which it is used.

Yet a further object of the present invention is to provide a locking twist pin screen panel retainer system which is easy to use and which is cost effective.

As will be described in the detailed description of the preferred embodiments, the locking twist pin screen panel retainer system in accordance with the present invention utilizes a plurality of locking twist pins that are receivable in cooperatively shaped receiving elements which are configured for use with either deck support tubes or deck bottom rails. Each such locking twist pin has a mushroom-shaped head that is adapted to be received in a cooperatively shaped chamber in the edge wall of preferably a urethane screen panel. Each twist pin has a shank with a radially extending pair of spreader projections. Each such spreader projection is sized to be engageable with a foot portion of a cooperatively shaped receiving element. As each locking pin is twisted or rotated by 90° about a longitudinal pin axis, the two locking projections will distort or displace portions of the cooperating foot. Each such locking pin is now secured in place on the associated deck support tube or deck bottom rail with its mushroom-shaped head oriented to be receivable in the cooperatively shaped chamber situated on an edge face of a screen panel that is to be attached to either the deck support tube or the deck bottom rail.

In one embodiment of the present invention, in which the deck support tube is a hollow tube that is provided with spaced holes, the cooperatively shaped receiving element is a deck support tube cover plate or mat that is provided with a depending foot which is sized to be inserted into one of the holes in the deck support tube. This deck support tube cover plate or mat is shaped to engage an upper surface of the deck support tube on which it is placed. A plurality of such plates or mats are used to attach a plurality of locking twist pins along the length of the vibrating separatory device.

If the vibrating separatory device uses a plurality of deck bottom rails instead of deck support tubes, each correspondingly shaped locking twist pin receiving element is a receiving collar that is insertable into a pipe hole sleeve assembly which is, in turn, welded or otherwise attached to a slot that is formed in the deck bottom rail. Again, the spreader projections on the shank of the locking twist pin are inserted into a complimentarily shaped aperture in the receiving collar which has a foot portion that is configured the same as the foot portion of the deck support tube cover mat or plate. Rotation or twisting of the locking pin through 90°, again deforms the foot of the receiving collar so that the pin is securely attached to the deck bottom rail with its mushroom-shaped head aligned to be secured in the chamber which is provided on the edge face of the screen panel.

Each locking twist pin is individually securable to its underlying deck support tube or deck bottom rail by its engagement with its cooperating retainer, whether that retainer is a deck support tube plate or mat or a deck bottom rail attached collar and pipe hole sleeve assembly. Each twist pin is securely locked in place upon its being rotated through only 90°. In its secured, locked position, the mushroom-shaped head of each such locking twist pin is aligned with the cooperatively shaped chamber in the edge wall of a screen panel that is to be used in the vibrating separatory machine. Each such panel is held in place by two laterally spaced support tubes or bottom rails and is engaged by at least two spaced ones of the locking twist pins.

The use of individual locking twist pins, in cooperation with their correspondingly shaped retainers, allows a wide range of application possibilities. Each pin is positionable in a cooperating receiver that has been adapted to the configuration of the underlying support tube or bottom rail. The spacing of the individual lockable twist pins is adaptable, by proper placement of the receptacles, to existing hole or slot configurations in support tubes or bottom rails. Each locking twist pin and its cooperating receiver are quickly and easily installed in either a deck support tube or a deck bottom rail that has been provided with the appropriate pipe hole sleeve assemblies. The locking twist pins are thus amenable for use with vibrating separatory devices having diverse hole patterns. While the heads of the locking twist pins are preferably mushroom-shaped, they can be formed or configured to be positioned in pin head receiving chambers of various shapes, as may be offered by other manufacturers of vibrating screen devices. The locking twist pins do not require extensive screen deck modifications and are very effective in securely holding the replaceable screen panels in position.

The locking twist pin screen panel retainer system in accordance with the present invention overcomes the limitation of the prior art devices. It is a structurally uncomplicated system that is adaptable for use with various decks having different hole patterns. The locking twist pins are easy to install in a short period of time without the need to use purpose made tools. Once so placed, the locking twist pins form secure points of attachment to the vibrating separatory screen or panels that are secured to the vibrating separatory device. The locking twist pin screen panel retainer system in accordance with the present invention overcomes the limitations of the prior art and is a substantial advance in the area of vibrating separatory screen technology.

BRIEF DESCRIPTION OF THE DRAWINGS

While the novel features of the locking twist pin screen panel retainer system, in accordance with the present invention, are set forth with particularity in the appended claims, a full and complete understanding of the invention may be had by referring to the detailed description of the preferred embodiments, as set forth subsequently, and as depicted in the accompanying drawings, in which:

FIG. 7 is a top perspective view of a deck support tube cover plate in accordance with the first preferred embodiment of the present invention;

FIG. 8 is a bottom perspective view of the deck support tube cover plate of FIG. 7;

FIG. 9 is a bottom plan view of the deck support tube cover plate;

DESCRIPTION OF PREFERRED EMBODIMENTS

Figure 1:
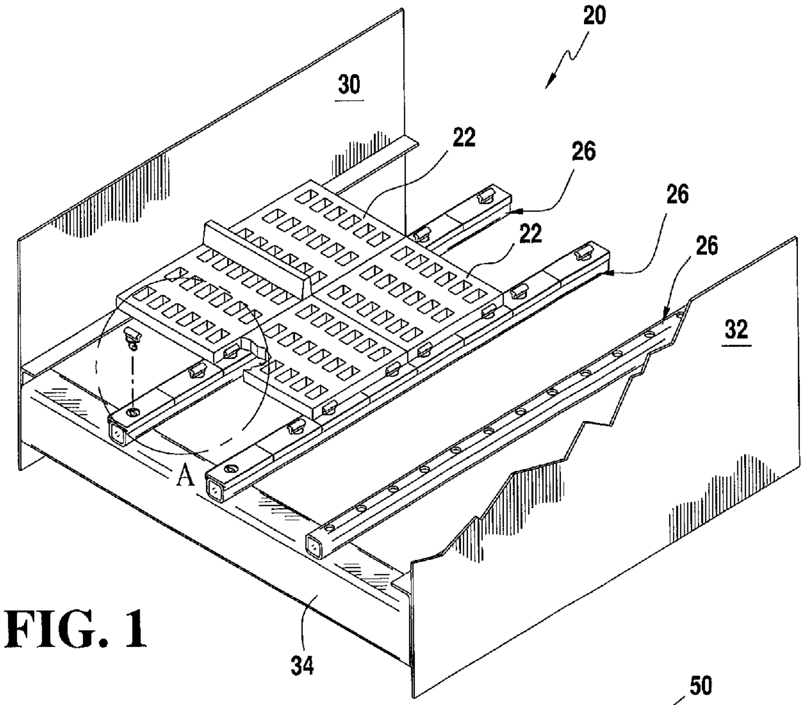
FIG. 1 is a perspective view of a vibrating separatory machine and showing a first preferred embodiment of a locking twist pin screen panel retainer system in accordance with the present invention.

Referring initially to FIG. 1, there may be seen, generally at 20, a somewhat schematic depiction of a first variation of a vibrating separatory machine in which a first preferred embodiment of the locking twist pin screen panel retainer system, in accordance with the present invention is being utilized. The vibrating separatory machine 20 depicted in FIG. 1 is intended to be representative of a class of such machines with which the present invention can be used. Such machines are manufactured by CONN-WELD INDUSTRIES, INC., the assignee of the subject application, as well as by other manufacturers. A more complete understanding of such equipment may be obtained by visiting the website of the assignee at www.conn-weld.com. Such vibrating separatory machines are also described in the assignee's prior U.S. Pat. Nos. 5,112,475; 5,398,817; 6,964,341; 7,717,269 and 7,946,428 as well as in assignee's pending U.S. patent application Ser. No. 13/049,000, filed Mar. 16, 2011, now U.S. Pat. No. 8,281,934, the disclosures of all of which are expressly incorporated herein by reference.

As is well known in the industry, vibrating separatory machines such as the one depicted at 20 in FIG. 1 are used to separate slurries of materials into their liquid and solid components. The slurry enters the machine generally at the upper right, as seen in FIG. 1, and flows downwardly and to the left. As the slurry flows across the surface of the separatory machine, it passes over an array of screen panels. These screen panels allow the liquidous material to flow through and out of the bottom of the machine. The solidus material travels along the surface of the screen panel and is allowed to exit at the left, as depicted in FIG. 1.

The screen panels are typically one of two generally well known types. In FIG. 1, there are depicted generally at 22, urethane screen panels. These urethane screen panels are typically 12 inch by 12 inch unitary panels that are provided with arrays of screening separatory compartments. This structure is described in greater detail in the above-recited U.S. Pat. No. 7,717,269, to which description one may refer for more detailed discussion of the structure and operation of the urethane screen panels 22. Suffice it to say that these panels have openings which are sized to perform their desired separatory function.

Figure 14:
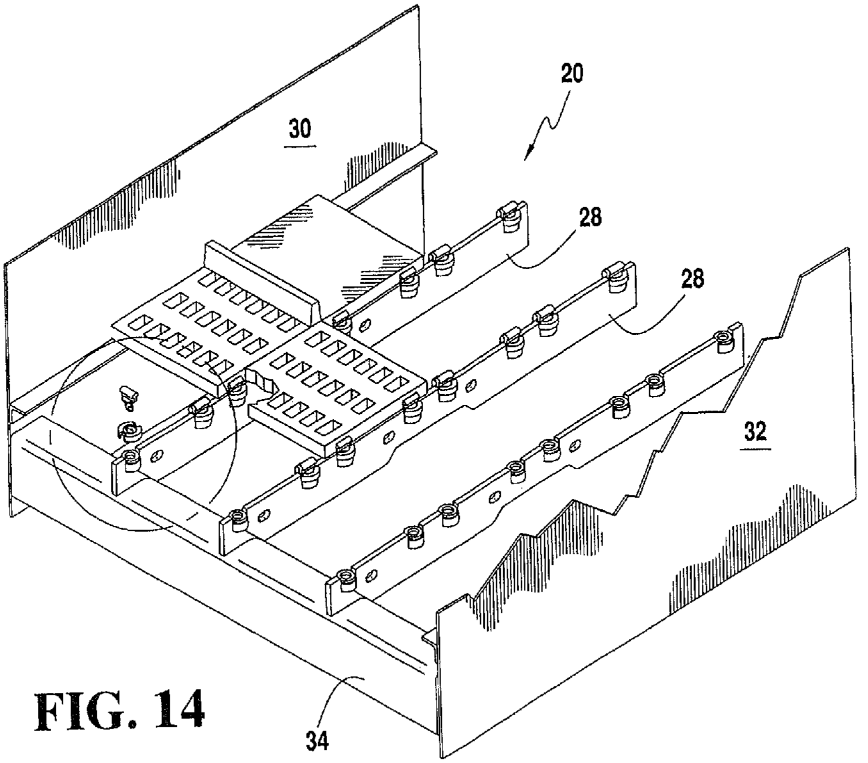
FIG. 14 is a perspective view of a second preferred embodiment of a locking twist pin screen panel retainer system in accordance with the present invention and showing the use of the invention with a vibrating separatory machine having a deck bottom rail.
Figure 15:
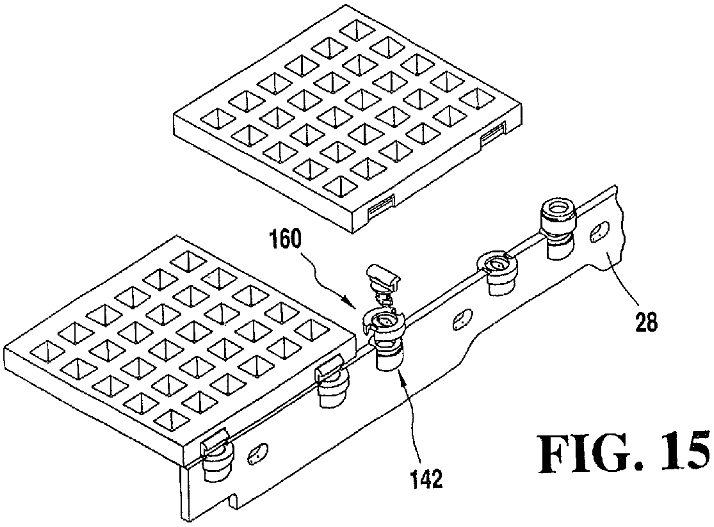
FIG. 15 is an exploded perspective view of a portion of the locking twist pin screen panel retainer system in accordance with the second preferred embodiment of the present invention.

FIG. 14 depicts, also somewhat schematically, and generally at 24, a second variation of a vibrating separatory machine. Both of the first and second variations 20 and 24 are essentially the same in overall structure and operation, as will be discussed in greater detail shortly. In the variation that is depicted somewhat schematically in FIG. 1, the urethane screen panels, generally at 22, are supported by deck support tubes 26. In the second embodiment depicted in FIG. 14, the urethane screen panels, again generally at 22, are supported by deck bottom rails 28. Both of the vibrating separatory machines depicted at 20 in FIG. 1 and at 24 in FIG. 14 operate in substantially the same manner. Since their screen support members are different, they utilize different embodiments of the locking twist pin screen panel retainer system, as will be discussed below.

In both of the first and second variations of the vibrating separatory machine, as depicted generally at 20 and 24, in FIGS. 1 and 14 respectively, the separatory panels, typically the urethane screen panels 22 or the equally well known profile wire screen panels, which are not specifically depicted, are replaceable. As they separate the slurry into its two components, they are worn down by the abrasive nature of the slurry. In time, the separatory screen panels have to be removed and replaced. The subject invention is directed to a locking twist pin screen panel retainer system that will make the task of removal and replacement of the screen panels, either of the urethane type or of the profile screen wire type, less complicated, easier, and accomplishable in a less time consuming manner than has been possible using the various prior art systems and structures.

Referring again to FIG. 1, the vibrating separatory machine, generally at 20, is constructed using a pair of spaced, lateral side walls or panels 30; 32. These lateral side panels 30; 32 extend generally in the flow direction of the slurry to be separated, which, as was discussed above, is from right to left as seen in FIG. 1. A plurality of machine cross frame tubes 34 extend between the lateral side walls or panels 30-32. These machine cross frame tubes 34 are spaced generally parallel to each other, and are generally transverse to the direction of slurry flow. The side panels 30; 32 and the machine cross frame tubes 34, as well as other conventional structural elements, which are not specifically shown, cooperate to define the overall frame structure of the vibrating separatory machine.

Figure 2:
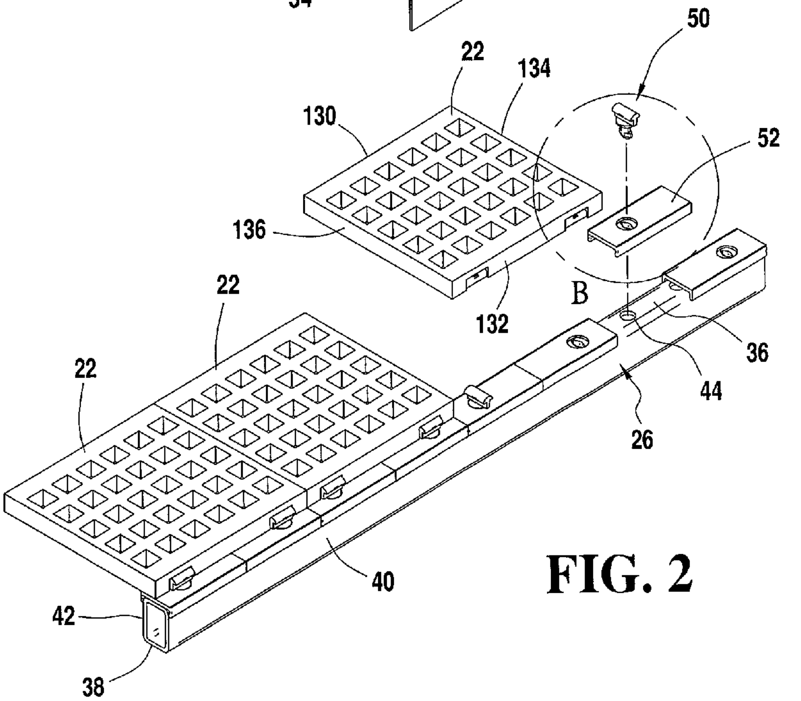
FIG. 2 is an exploded perspective view of a portion of the vibrating separatory machine of FIG. 1, and showing the portion thereof encircled at A in FIG. 1.
Figure 11:
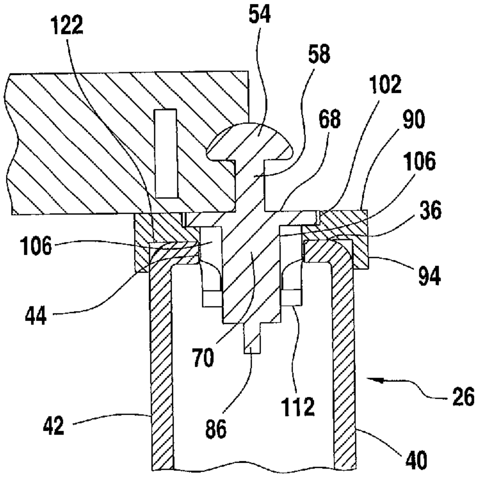
FIG. 11 is a cross-sectional view of a portion of an assembled locking twist pin, deck support tube cover plate, deck support tube and urethane screen panel.
Figure 13:
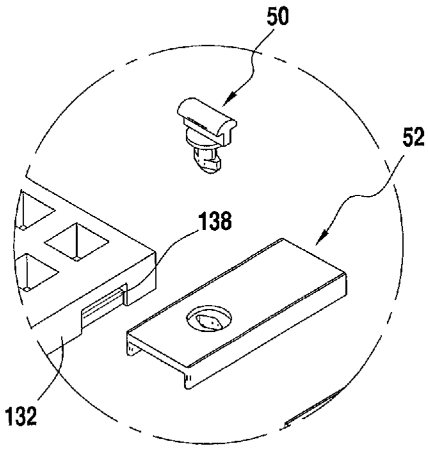
FIG. 13 is an enlarged perspective view of the encircled portion of FIG. 2 and showing both an inserted locking twist pin and an uninserted twist pin.

A plurality of the deck support tubes, generally at 26, as seen in FIG. 1, are secured to the machine cross frame tubes 34. These deck support tubes 26, as seen in FIG. 1, are spaced from each other and are parallel to the lateral side panels 30-32. As may be seen perhaps more clearly in FIGS. 2, 11 and 12, each deck support tube 26 is in the form of a metal tube, and preferably as a stainless steel tube that is approximately 2 inches by 2 inches and which has a wall thickness of approximately ¼ of an inch. As seen in FIG. 2, each deck support tube 26 has a top surface 36, a bottom surface 38, and spaced right and left side surfaces 40 and 42, respectively. A plurality of longitudinally spaced bores or holes 44 are spaced along the top surface 36 of each deck support tube 26. These top surface holes 44 may be aligned with corresponding bottom surface holes which are not specifically shown. These holes 44 are spaced apart from each other at a conventional spacing distance, which may be, for example, 4 inches on center. The structure and hole spacing of these deck support tubes 26 has been standardized by the majority of the manufacturers of such vibrating separatory machines.

In the first embodiment of the present invention, as depicted in FIGS. 1-13, the screen panels, typically the urethane screen panels 20, are attached to the top surfaces 36 of adjacent ones of the parallel deck support tubes 26 by the use of a plurality of locking twist pins, generally at 50, and cooperating deck support tube cover mats or plates, generally at 52. These locking twist pins 50 and their receiving mats or plates 52 form a very secure series of attachment points to which the urethane screen panels 22 can be readily attached while still being removable.

Figure 3:
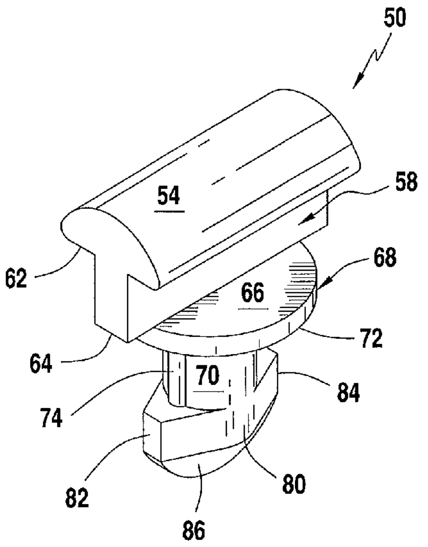
FIG. 3 is a perspective view of a locking twist pin.
Figure 4:
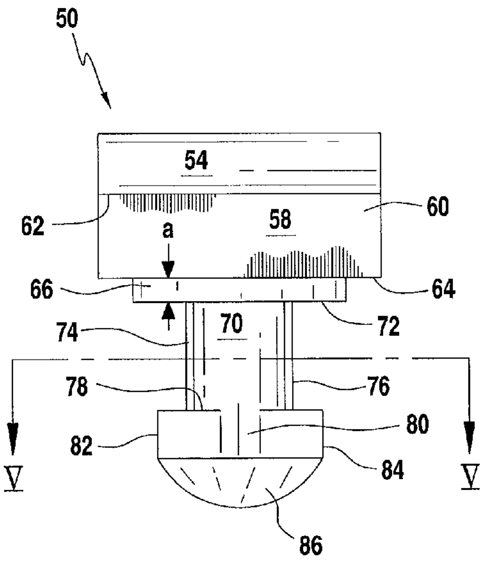
FIG. 4 is a side elevational view of the locking twist pin of FIG. 3.
Figure 6:
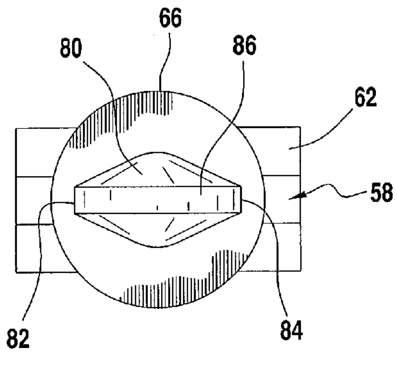
FIG. 6 is a bottom plan view of the locking twist pin in accordance with the present invention.
Figure 5:
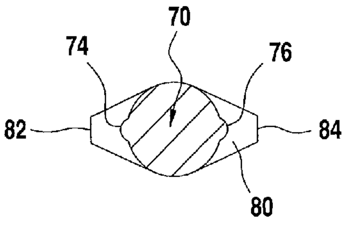
FIG. 5 is a cross-sectional view of the lower portion of the locking twist pin, taken along line V-V of FIG. 4.
Figure 10:
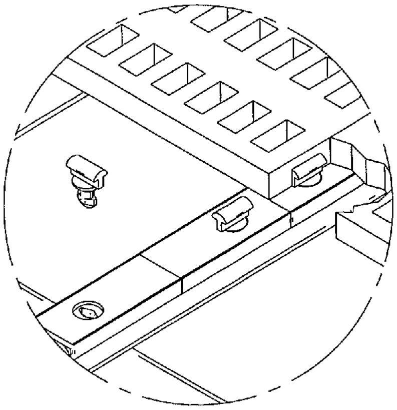
FIG. 10 is an enlarged exploded perspective view of the encircled portion B of FIG. 1 and showing a locking twist pin and a deck support tube cover plate.

Turning now to FIGS. 3-6, there may be seen a detailed depiction of a locking twist pin generally at 50, in accordance with the present invention. Locking twist pin 50 includes a generally mushroom-shaped head 54 that is configured in a manner which is described in detail in U.S. Pat. No. 8,281,934. As is there described, each mushroom-shaped head 54 is generally semi-cylindrical in shape and extends, in its installed position, in the direction of flow of the material passing over the screen panels 22 of the vibrating separatory machine 20. Each such mushroom-shaped head 54 is supported by a head shank 58 whose upper end 60 engages a lower, generally planar surface 62 of the mushroom-shaped head 54. A lower end 64 of the head shank 58 is secured to an upper face 66 of an annular twist pin flange 68. As is depicted in FIGS. 3, 4 and 6, that twist pin flange 68 is generally circular in plan view and has a flange thickness "a" that will be discussed below.

A generally cylindrical twist pin shank 70 depends from a lower face 72 of the annular twist pin flange 68. This twist pin shank 70 is generally cylindrical but preferably also has a pair of parallel, downwardly spaced deflection ribs 74; 76. The twist pin shank 70 is formed, at its lower end 78, with a twist pin deflection and securement fin assembly, generally at 80, and referred to as a fin in the subsequent discussion. The fin 80 is somewhat ovoid in plan view, as seen perhaps most clearly in FIGS. 3 and 5 and is defined by a pair of radially outwardly depending fin projections 82 and 84. A generally semi-circular twist pin insertion tip 86 depends from a lower surface 88 of the twist pin deflection and securement foot assembly or fin 80.

Referring again to FIGS. 1 and 2, as well as to FIGS. 7-9, each locking twist pin 50 is, in accordance with the first preferred embodiment of the present invention, is usable cooperatively with a deck support tube cover mat or plate 52. As depicted more clearly in FIGS. 7-9, each such deck support tube cover plate or mat 52 hereafter a cover plate 52, includes a generally planar plate top 90 and a pair of depending plate sides 92; 94. The plate sides 92; 94 have inner surfaces that are spaced apart by a plate interior spacing width "b", as seen in FIG. 9. The plate interior spacing width "b" is sized to allow the plate 52 to be positionable on the upper surface 36 of the deck support tube 26. The two plate sides 92; 94 depend downwardly and, in the installed position of each such plate 52, are adjacent to the side walls 30; 32 of the deck support tube 26. Each deck support tube cover plate or mat 52 thus acts somewhat as a saddle that is positionable atop a section of each deck support tube 26.

Again referring to FIGS. 7-9, each deck support tube cover plate or mat 52 is formed with an integral plate foot, generally about 100. The plate foot, generally at 100, is configured having a pin flange receiving counterbore or countersink 102 and having a depth that is the same as the thickness "a" of the twist pin flange 68. It will be understood that the diameter of the plate counterbore or countersink 102 is sized to receive the locking twist pin flange 68 so that the top 66 of the flange 68 will be coplanar with an upper surface 104 of the plate top 90. The plate foot 100 is defined by a pair of deflectable locking legs 106 which are spaced by a pair of diametrically opposed foot slots 108. A locking twist pin fin receiving aperture 110 is formed generally centered in the plate counterbore or countersink 102. This aperture 110 is sized to allow passage of the fin assembly 80 of the locking twist pin 50 generally.

As seen in FIG. 7, the fin receiving aperture 110 is situated so that its long dimension is generally transverse to the direction of flow of materials across the screen surface of the vibrating separatory machine, generally at 20. Since the fin 80 of the locking twist pin and the pin's mushroom-shaped head 54 are oriented parallel to each other, as seen in FIG. 3, when the fin 80 of the locking twist pin 50 is inserted into the plate aperture 110 the axis of the mushroom shaped head 54 of the locking twist pin 50 is also generally transverse to the flow direction of material flowing over the screen panels 22, generally from the right to the left, as depicted in FIG. 1. In this regard, attention is directed to the encircled portions of FIGS. 1 and 2 and their enlarged depictions in FIGS. 10 and 13 respectively.

Figure 12:
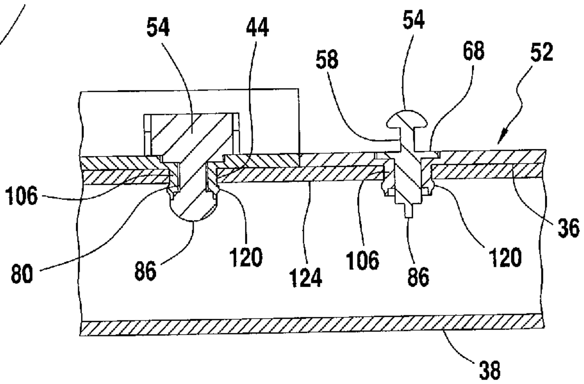
FIG. 12 is another cross-sectional view of the assembly depicted in FIG. 11 and showing a second locking twist pin in an inserted but not locked position.

Once the locking twist pins fin 80, guided by the twist pin insertion tip 86, has been passed through the fin receiving aperture 110 of the plate 90, which plate having been previously placed atop the top surface 36 of the deck support 226, and with the plate foot 100 having been inserted into one of the spaced holes 44 in the top of the deck support tube, 26, the locking twist pin will be rotated by generally 90° about a longitudinal pin axis of rotation. As is shown in FIGS. 8, 9 and 12, each deflectable locking leg 106 has a lower leg face 112 which defines a fin track 114. The fin track 114 has as pair of overcenter recesses 116 that will capture and hold the fin projections 82; 84 once the pin shank has been passed through the fin receiving aperture 110 so that the pin flange 68 is received in the plate countersink or counterbore 102. As the mushroom-shaped head 54 of the locking twist pin 50 is rotated, either manually or by the use of an appropriately configured tool, through 90°, the fin projections 82 and 84 will follow the fin track 114 in the lower faces 112 of the deflectable locking legs 106 of the plate foot 100. This rotation of the mushroom-shaped head 54 of the locking twist pin through its 90° path, will cause the fin projections 82 and 84 to seat in the overcenter recesses 116. The deck support tube cover plate or mat, generally at 52, is made of a deformable plastic material. One such suitable material is a 65D durometer urethane material. As the fin projections 82 and 84 twist along the fin track 114 in the end face of the two legs 106 of the bifurcated plate foot 100, those two legs 106 will be spread radially apart. The radial spreading of the two legs 106 is further accomplished by the action of the deflection ribs 74 and 76 on the shank 70 of the twist pin 50 engaging with inner walls 118 of the deflectable locking legs 106.

Each of the deflectable locking legs 104 of the plate foot, generally at 100 has a circumferentially extending, raised rib 120 intermediate each such foot connection to an undersurface 122 of the plate top and the lower face 112 of each such leg. As may be seen, perhaps most clearly in FIGS. 11 and 12, each hole 44 in the upper surface 36 of each deck support tube 26 is sized to be able to receive the plate foot 100, when this foot has not yet been deformed or deflected by the insertion and subsequent rotation of one of the locking twist pins 50. The engagement of each plate foot, generally at 100, in its receiving hole 44 in the upper surface 36 of the deck support tube 26 should be an interference fit. This will allow the deck support tube cover plates or mats 52 to be positioned atop the upper surface of the deck support tubes 26 during their final securement using the locking twist pins 50.

Again referring to FIG. 12, once the locking twist pins 50 have been inserted into its associated plate foot, generally at 100, and have been rotated by 90°, the two deflectable locking legs 106 will have been spread radially apart by the action of the fin projections 82; 84 as they follow the fin track 114 in the end of each leg 106. The camming action of the fin projections 82; 84, as well as the spreading action of the two pin shank ribs 74; 76, will spread the legs 106 of the plate foot 100 sufficiently to ensure that the radial ribs 120 on each such leg 106 will be forced outwardly and will engage the undersurface 124 of the top of the deck support tube 26.

Each deck support tube cover plate or mat 52 preferably has an overall length of 6 inches, with each plate foot, generally at 100, being located 2 inches inboard of one end of the cover plate or mat 52. The holes 44 are typically arranged at 4 inch centers along the top 36 of the deck support tube 26. Since the deck support tubes typically have holes spaced every four inches along their length, the deck support tube plates or mats 52, when installed, will typically overlie and occlude selected one of these holes.

If the locking twist pins in accordance with the present invention were to be utilized with screen panels of smaller size, it would be possible to reconfigure the cover plates or mats 52 so that they would not cover or occlude selected ones of the deck support tube holes 44.

Each of the urethane screen panels, generally at 22, has spaced panels side faces 130; 132 and spaced screen panel end faces 134, 136. The side faces 130; 132 are provided with spaced fastening chambers 138, one of which can be seen most clearly in FIG. 13. As is described in detail in U.S. Pat. No. 8,281,934, the urethane screen panel side face chambers 138 are configured to each receive one half of a width of a mushroom-shaped head of a locking twist pin and one half of a width of the head shank. As may be seen at the left of FIG. 1, two laterally adjacent urethane screen panels are held in place by having their side faces engaged by the mushroom-shaped heads 54 of one of the locking twist pins. The resilient nature of the urethane screen panels, and also the locking twist pins, which are both preferably made using 65D durometer urethane, results in the positive yet releasable securement of the screen panels to the mushroom-shaped heads of the locking twist pins 50.

Various arrangements of vibrating separatory machines are made by a number of manufacturers. While large number of these machines utilize the spacing and configuration of deck support tubes depicted at 24 and FIGS. 1 and 2, others use deck bottom rails 28, as is depicted in FIGS. 14-19. Such deck bottom rails 28 require a second preferred embodiment of the locking twist pin screen panel retainer system in accordance with the present invention. As may be seen in FIG. 14, which will be understood as being exemplary of various possible deck bottom rail structures, a plurality of spaced deck bottom rails, generally at 28 are supported by the machine cross frame tubes 34. These deck bottom rails 28 are depicted as being generally flat pieces of metal rail that are welded or otherwise secured, in an on-edge orientation, to the machine cross frame tubes 34. In this second embodiment of the subject invention, while the locking twist pins are the same in shape and operation as their counterparts in the first embodiment, the structure of the pin receiving elements is somewhat different. Since the locking twist pins 50 are the same in each embodiment, they will not be described again in this second embodiment. The same reference numerals will be used to identify the locking twist pins in the second embodiment as were used in the first embodiment.

Figure 16:
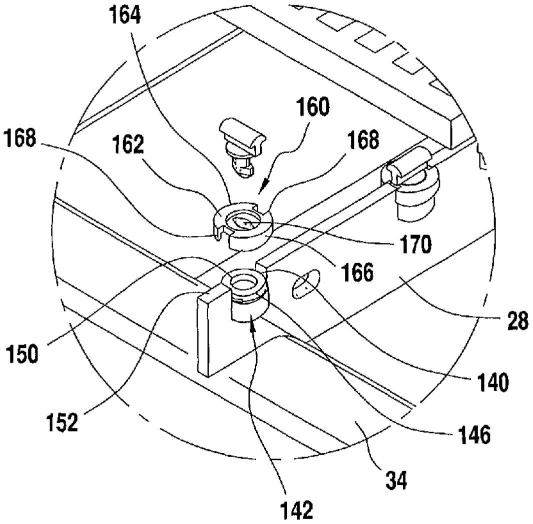
FIG. 16 is an enlarged view of the encircled portion of FIG. 14.
Figure 17:
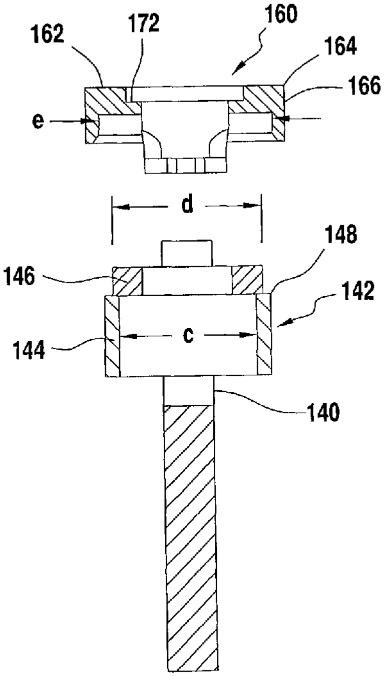
FIG. 17 is a cross-sectional, exploded view of the receiving collar and pipe hole sleeve, for use with the deck bottom rail in accordance with the present invention.
Figure 18:
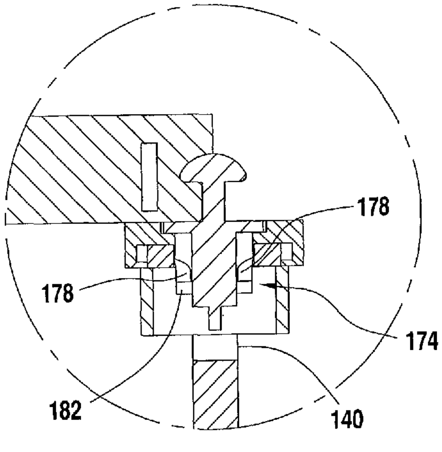
FIG. 18 is a cross-sectional end view of the second preferred embodiment of the present invention.
Figure 19:
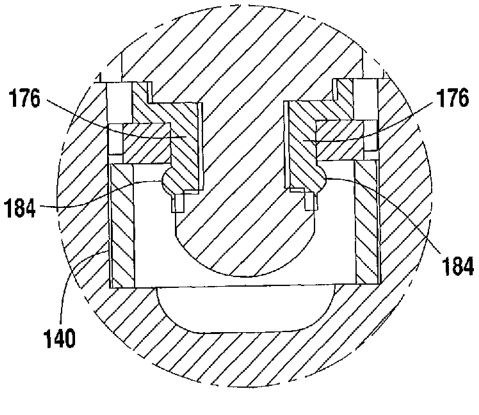
FIG. 19 is a cross-sectional side view of the assembled twist pin, receiving collar and pipe hole sleeve in their assembled position, all in accordance with the second preferred embodiment of the present invention.

Each one of the deck bottom rails 28 is provided with spaced cut-outs, generally at 140, as seen, for example, in FIG. 16. Each such cut-out 140 is sized to receive and to support a pipe hole assembly 142. Each such pipe hole assembly 142 includes a cylindrical pipe section 144 with a reduced diameter annular ring 146 secured to its upper surface. An inner diameter "c" of each pipe section 144 is less than an outer diameter "d" of each cooperating ring 146. The rings 146 may be secured, by welding, to an upper face 148 of each cylindrical pipe section 144. Each such cylindrical pipe section 144 is secured, also typically by welding, to walls of each cut-out 140. As seen in FIGS. 16 and 17, an upper surface 150 of each annular ring 146 is spaced below a top surface 152 of each deck bottom rail 28.

Each of the pipe hole assemblies 142 is usable with a twist pin receiving collar, generally at 160. Each such twist pin receiving collar 160 is generally analogous to the deck support tube cover plate or mat 52 that was described in connection with the first preferred embodiment of the subject invention. Instead of the deck support tube cover plate or mat 52 being supported by the deck support tube 26, in the second preferred embodiment of the subject invention, the twist pin receiving collar, generally at 160, is configured to be supported by, and to co-act with the pipe hole assembly 142 to provide an attachment point for each one of the plurality of locking twist pins 50 of the present invention.

Each locking twist pin receiving collar 160 has a generally planar, circumferential collar top 162 that terminates, at its outer edge, in a generally annular collar rim 164. That collar rim 164 is bounded by a downwardly directed collar flange 166. As seen in FIG. 16, the collar flange 166 is provided with a pair of diametrically opposed collar flange slots 168. Those two collar flange slots 168 each have a circumferential width sufficient to receive the upper surface 152 of a deck bottom rail 28. They will thus hold the twist pin receiving collar 160 in place, secure against rotation, when the receiving collar 160 is placed atop the upper surface 150 of the annular ring 146 of the pipe hole assembly 142. The collar flange 166 has an inner diameter "e" that is slightly greater than the outer diameter "d" of the annular ring 146 which is welded or otherwise fashioned on top of the cylindrical pipe section 144 of the pipe hole assembly 142. As may be seen in FIGS. 18 and 19, this allows the twist pin receiving collar 160 to be placed on top of the pipe hole assembly 142 and to be held in place by the cooperation of the collar flange slots 168 with the edges of each cut-out 140 in the deck bottom rail 28.

The locking twist pin receiving collar, generally at 160, is preferably formed with the same material as is used to form the deck support tube cover plate or mat 52; i.e. a 65D durometer urethane material. This locking twist pin receiving collar 160 has a fin receiving aperture 170 that is the same in function and shape as the fin receiving aperture 110 of the plate foot 100. It also has a counterbore or countersink 172 which is again sized to receive the twist pin flange 68 of a locking twist pin 50. As seen most clearly in FIGS. 17, 18 and 19, the twist pin receiving collar 160 also has a foot 174 which is generally cylindrical and which is separated into displaceable locking legs 176 by a pair of foot slots 178. A lower leg face 182 of the twist pin receiving collar 160 is provided with the same fin track and over center recesses, which are not specifically shown in FIGS. 17-19, but which function in the same manner as their counter parts in the plate foot, generally at 100. A pair of raised ribs 184 are provided at the lower ends of the two deformable locking legs 176 of the twist pin receiving collar. As was the case when the locking twist pin 50 was inserted into the plate foot, generally at 100, when the same locking twist pin 50 is inserted into the twist pin receiving collar and is rotated by 90°, the movement of the fin assembly 80 will deflect the two legs 176 radially outwardly. In this second embodiment, the raised ribs 184 will deflect out beneath the lower surface of the annular ring 146 that is part of the pipe hole assembly 142. Since the pipe hole assembly 142 has been welded or otherwise securely attached to the slot or cut out 140 in the deck bottom rail 28, the deflection of the locking legs 176 radially outwardly, in response to the rotation of the locking twist pin through 90°, will, as it did in the case of the deck support tube cover mat or plate 52, attach that cover or mat 52 or that receiving collar 160 to the underlying structural member of the vibrating separatory machine.

In both embodiments of the present invention, the locking twist pin is inserted into a deformable receiver. That receiver, either the plate foot, generally at 100 or the collar foot, generally at 174, includes a pair of opposed deformable locking legs. The locking legs are deformed radially outwardly as the inserted locking twist pin is rotated through 90°. That radial deformation secures the locking twist pin in place with its mushroom-shaped head properly aligned to be engageable with the chambers that are formed in the edge faces of the urethane screen panels. The result is a structurally durable, uncomplicated fastening assembly for securing screen panels in place on a vibrating separatory machine. The system in accordance with the present invention is adaptable to most, if not all of the vibrating separatory machines in commercial use, requires little or no modification of those machines, and is able to readily position the screen retaining mushroom-shaped heads in their operative locations.

While the subject invention has been described primarily in connection with the securement of urethane screen panels to the deck support tubes or deck bottom rails of a vibrating separatory machine, it will be understood that the system is equally suitable for use with profile wire screen panels that are provided with urethane screen panel edge strips. Such profile wire screen panels are described and depicted in applicants patent application Ser. No. 13/049,000, which was previously incorporated herein by reference.

It will also be understood that suitable dams and dam retainers can also be secured in place using the lockable twist pin screen panel retainers in accordance with the present invention. One cross dam is depicted schematically in FIG. 1 of the present application. Again, the structure of the cross dams and dam retainers, as is set forth in greater detail in U.S. Pat. No. 8,281,934, is usable with the screen panel retainer system of the present invention.

While preferred embodiments of a locking twist pin screen panel retainer system in accordance with the present invention have been set forth fully and completely hereinabove, it will be apparent to one of skill in the art that changes in, for example, the number of screen panels securable to a machine deck, the sizes of the apertures in the screen panels, the specific resilient material used to form the screen panels, and the composition of the screen panel retaining pins and receivers and the like could be made without departing from the true spirit and scope of the present invention which is to be limited only by the appended claims.

What is claimed is:

1. A locking twist pin screen panel retainer system for use with a vibrating separatory machine having a plurality of screen panels and comprising:

a plurality of deck support tube cover plates securable to a machine deck of said vibrating separatory machine;

at least one deformable twist pin receptacle in each of said deck support tube cover plates, each said deformable twist pin receptacle being receivable in an aperture in said machine deck and including a deformable foot, each said deformable foot including first and second deformable locking legs defined by first and second diametrically opposed foot slots with each said deformable locking leg including an outer radial raised rib;

a lower leg face on an inner surface of each of said deformable locking legs, each said lower leg face defining a fin track, each said fin track having an overcenter recess; and a plurality of lockable twist pins each adapted to be inserted into a twist pin receiving aperture in a respective one of said deformable twist pin receptacles, each of said lockable twist pins including a screen panel engaging head, a twist pin shank depending from said screen panel engaging head and a twist pin deflecting and securement fin assembly at an end of said twist pin shank remote from said screen panel engaging head, said twist pin deflecting and securement fin assembly on each said lockable twist pin having a pair of radially outwardly directed fin projections, each said fin projection being receivable in a cooperating one of said fin tracks to deform a respective one of said deformable locking legs of said deformable foot of a respective one of said twist pin receptacles radially outwardly in response to a rotation of said twist pin inserted in said aperture and received in said twist pin receptacle through an angle of generally 90° about a longitudinal axis of each respective twist pin, to spread said first and second deformable locking legs radially apart in response to said rotation of said fin projections of one of said twist pins in said fin track into said overcenter recess and to position said outer radial raised rib on each of said deformable locking legs under a lower surface of said machine deck.

2. The locking twist pin screen panel retainer system of claim 1, wherein each screen panel engaging head is mushroom-shaped.

3. The locking twist pin screen panel retainer system in accordance with claim 2 further including a head shank interposed between said mushroom-shaped head and said twist pin shank.

4. The locking twist pin screen panel retainer system of claim 3, further including a twist pin flange at a juncture of said head shank and said twist pin shank.

5. The locking twist pin screen panel retainer system of claim 1, wherein said pair of radially outwardly directed fin projections are each parallel to a longitudinal axis of said mushroom-shaped head.

6. The locking twist pin screen panel retainer system of claim 1, further including a twist pin insertion tip underlying said pair of radially outwardly directed fin projections.

7. The locking twist pin screen panel retainer system of claim 1, further including first and second diametrically spaced deflection ribs on said twist pin shank.

8. The locking twist pin screen panel retainer system of claim 1, wherein each of said deck support tube cover plates is securable to a deck support tube of said machine deck and having said aperture, each said aperture being adapted to receive said deformable foot of one of said deformable twist pin receptacles.

9. The locking twist pin screen panel retainer assembly of claim 1, wherein each said deformable twist pin receptacle depends from its associated deck support tube cover plate.

* * * * *